United States Patent [19]

Kikuzawa et al.

[11] Patent Number: 4,465,399

[45] Date of Patent: Aug. 14, 1984

[54] ARTIFICIAL REEF ASSEMBLY CONSTRUCTION AND A METHOD

[75] Inventors: Kenji Kikuzawa; Shozo Akasaka, both of Moriyama, Japan

[73] Assignee: Asahi Kasei Kogyo Kabushiki Kaisha, Osaka, Japan

[21] Appl. No.: 346,186

[22] Filed: Feb. 5, 1982

Related U.S. Application Data

[63] Continuation-in-part of Ser. No. 190,055, Sep. 23, 1980, abandoned.

[51] Int. Cl.$^3$ ............................................. E02B 3/06
[52] U.S. Cl. ...................................... 405/32; 405/23; 405/25
[58] Field of Search .................................. 405/15-35, 405/203, 204, 210, 205, 206, 271; 404/6

[56] References Cited

U.S. PATENT DOCUMENTS

| | | | |
|---|---|---|---|
| 1,060,357 | 4/1913 | Nies | 405/32 |
| 1,873,496 | 8/1932 | Snyder | 405/32 X |
| 1,888,364 | 11/1932 | Van Orman | 405/32 |
| 2,135,337 | 11/1938 | Herbest | 405/32 |
| 3,036,438 | 5/1962 | Sims | 405/206 |
| 3,563,037 | 2/1971 | Stammers | 405/23 |
| 3,756,034 | 9/1973 | Lockridge et al. | 405/171 |
| 4,191,494 | 3/1980 | Nakamura et al. | 405/171 |

FOREIGN PATENT DOCUMENTS

| | | | |
|---|---|---|---|
| 1541188 | 8/1968 | France | 405/23 |
| 51-33089 | 3/1976 | Japan | |
| 52-107987 | 9/1977 | Japan | |
| 58394 | 5/1978 | Japan | 405/32 |
| 53-69192 | 6/1978 | Japan | |
| 54-54894 | 5/1979 | Japan | |

OTHER PUBLICATIONS

Fisheries Engineering, May 1977, (Japan).

Primary Examiner—Dennis L. Taylor
Attorney, Agent, or Firm—Birch, Stewart, Kolasch & Birch

[57] ABSTRACT

An artificial reef assembly construction is disclosed which comprises, in combination, an artificial reef assembly comprising a plurality of reef units each comprising a hollow structure and a predetermined number of floaters, each floater comprising a body casing having an inner chamber partitioned so as to be fluid tight by means of at least one partition wall to have a plurality of air chambers, the floaters being releasably secured into the hollow structures of reef units, at least one of the plurality of air chambers having at least one openable portion. The artificial reef assembly construction with its floaters filled with air can be floated on the surface of the sea and easily towed to a desired location, where by only opening at least one openable portion of of at least one of the air chambers the artificial reef assembly can be easily submerged while causing the floaters to be automatically released from the artificial reef assembly. The released floaters are left afloat on the surface of the sea and, hence, they can be easily recovered.

3 Claims, 12 Drawing Figures

ARTIFICIAL REEF ASSEMBLY CONSTRUCTION AND A METHOD

This application is a continuation-in-part of our U.S. Application Ser. No. 190,055, filed on Sept. 23, 1980, now abandoned.

This invention relates to an artificial reef assembly construction comprising in combination an artificial reef assembly and a floater and a method for floating an artificial reef assembly on the sea by means of floaters releasably secured thereto, transporting the artificial reef assembly to a predetermined location, submerging the same beneath the sea, and recovering the floaters. More particularly, the present invention is concerned with an artificial reef assembly construction adapted to be floated on the sea by means of floaters releasably secured thereto, to be easily transported to a predetermined location and to release the floaters therefrom. The present invention is also concerned with a method for floating an artificial reef assembly by means of floaters releasably secured thereto, transporting the artificial reef assembly to a predetermined location, submerging the same beneath the sea while leaving the floaters on the sea and recovering the floaters.

Recently, various investigations have been made with respect to suitable structures of artificial reefs from the viewpoint of ecology as related to fish. As a result, it has been proposed to install large quantities of large-size structures having not only an appropriate length and height but also an open space therein, and capable of flowing tidal currents therethrough. These structures, however, are difficult to transport on the sea and install at a desired location due to the large size thereof. In the case of an artificial reef comprising a concrete block, there is an additional disadvantage that because of its heavy weight this type of artificial reef is very difficult to handle and transport and usually needs a large-size boat with a crane mounted thereon for installing it in a desired location, leading to an increasing tendency to use large-size boats for handling artificial reef assemblies. On the other hand, the area in which artificial reefs are installed are not limited to the ocean, but artificial reefs are often installed beneath the near sea to obtain effective fish-gathering results. In the latter case, it is substantially impossible to use a large-size boat, leading to great difficulties in practice.

Previously, the present inventors and others proposed an artificial reef assembly comprising a plurality of reef units each comprising a hollow cylindrical structure formed by spirally winding elongated fiber glass-reinforced plastics (see Japanese Patent Application Publications Nos. 830/1979 and 24953/1979 and Japanese Utility Model Application Publication No. 8536/1980). Fiber glass-reinforced plastics have a low specific gravity and can be easily shaped into a desired structure and, hence, they are advantageously employable as materials for producing light-weight, large-size artificial reefs. More specifically, the proposed artificial reef assembly comprises artificial reef units each comprising a hollow structure having at one end thereof a first opening and at the other end thereof a second opening and having a peripheral framework extending from the circumference of the first opening to the circumference of the second opening, the peripheral framework comprising a plurality of first fiber-reinforced plastic bands wound spirally about an axis of the hollow structure from the first opening to the second opening at an oblique angle with the axis to have a plurality of phases of the number corresponding to the number of the first fiber-reinforced plastic bands and a plurality of second fiber-reinforced plastic bands wound spirally about the axis in a direction opposite to the first fiber-reinforced plastic bands to have a plurality of phases of the number corresponding to the number of the second fiber-reinforced plastic bands, thereby forming lattice pattern windows respectively defined by the first fiber-reinforced plastic bands and the second fiber-reinforced plastic bands intersecting therewith. The cross-sectional shape of the hollow structure may be circular, elliptical, triangular, rectangular, pentagonal, hexagonal,—or polygonal. The circular shape in cross-section is most preferred because the structure having a circular shape in cross-section has the highest resistance to external force. Such an artificial reef assembly is large in size and, therefore, as mentioned above, difficult to in transport on the sea to a desired location.

On the other hand, the present inventors previously proposed a method for transporting an artificial reef assembly comprising a plurality of artificial reef units piled up into a shape of a pyramid to a predetermined location of the marine environment and submerging the same beneath the sea which comprises inserting a nylon air-bag coated with a synthetic rubber into a predetermined number of the base reef units so that the center of buoyancy of the air-bag deviates from the center of gravity of the reef units, followed by inflation of the air-bags with gas by using a gas cylinder or the like; hoisting the artificial reef assembly with the air-bags and lowering the same on the inshore to float the artificial reef assembly on the sea while the artificial reef assembly with the air-bags is slightly inclined relative to the sea surface; tugging the artificial reef assembly to a predetermined location on the sea by a boat; and deflating the air-bags from one to another by removing the air-stoppers therefrom so that the air-bags are released from the artificial reef assembly and the artificial reef assembly can be submerged beneath the sea. (see Japanese Publication "Fisheries Engineering", May 1977 and Japanese Patent Application Laid-Open Specification No. 107987/1977) With these previous methods, however, each of the air-bags released from the artificial reef assembly begins to deflate and collapse under the pressure of sea water immediately after the removal of the air-stoppers. As a result of this, the air-bags inevitably submerge beneath the sea in a time as short as about fifteen minutes and, hence, the air-bags cannot be recovered.

Japanese Patent Application Laid-Open Specification No. 58394/1978 discloses an artificial reef assembly characterized in that it consists of a plurality of cylindrical artificial reef units made of steel and held together on reinforcing base rods and a method constructing of the above-mentioned artificial reef assembly in which the assembling of the reef units and reinforcing base rods into an artificial reef assembly is conducted on the sea. According to this publication, prior to assembling of the components into an artificial reef assembly, a bag-like floater made of rubber is inserted into each of the reef units so that the reef units will stay afloat during the assembling operation. The artificial reef assembly thus constructed is subsequently submerged beneath the sea by the gradual deflation of the floaters. This proposed artificial reef assembly, however, is inevitably accompanied by difficulty in recovery of the floaters, because the floater is stably put in each of the reef units and, therefore, after the removal of the air-stopper the floater is collapsed while being stably put in the artificial reef assembly and submerged beneath the sea together with the artificial reef assembly. To recover the floaters which have once sunk to the sea bottom, it is necessary to pull them up from the sea bottom by means of a wire rope or the like. For this reason, the recovering operation cannot be practically effected when the artificial reef assembly is submerged in the deep sea.

In general, with respect to the artificial reef assembly- transporting and -submerging technique utilizing floaters, the recovery of the floaters is very important from an economic point of view. Specifically stated, an airbag made of a flexible material, such as a fluid-tight synthetic fabric, generally costs approximately US$ 750, and a floater made of rigid material, such as a steel or a rigid plastic material, generally costs approximately US$1500. When a four-step artificial reef assembly comprising four reef units at its bottom step is employed in combination with air-bags incorporated therein, the total expense for the air-bags amounts to approximately US$3000. When the above-mentioned artificial reef assembly is employed in combination with floaters made of a rigid material, the total expense for the floaters amounts to approximately US$6000. From the above estimation of cost, it will be easily understood that recovery of the floaters is extremely important from a practical viewpoint. In this respect, the conventional artificial reef assembly constructions and methods have a fatal defect in that the floaters used are hardly ever recovered.

With a view to eliminating such a defect as described above, the present invention has been developed. It has been found that an artificial reef assembly construction comprising, in combination, an artifical reef assembly comprising artificial reef units, each comprising a hollow structure formed by spirally wound elongated fiber glass-reinforced plastics and a predetermined number of floaters, each floater comprising a body casing having an inner chamber fluid-tight partitioned by means of at least one partition wall to have a plurality of air chambers, is extremely easy to marine transport to a desired location and submerge there while leaving the floaters reliably on the sea so that the floaters can be easily recovered. The present invention has been made, based on such a novel finding.

Accordingly, it is an object of the present invention to provide an artificial reef assembly construction which is useful for marine transporting the artificial reef assembly to a desired location and submerging the same there beneath the sea while leaving on the sea the floaters used in the artificial reef assembly construction so that the floaters can be easily recovered.

It is another object of the present invention to provide a method for easily floating an artificial reef assembly on the sea by means of floaters, transporting the artificial reef assembly to a predetermined location, submerging the same beneath the sea while leaving the floaters on the sea so that the floaters can be easily recovered.

The foregoing and other objects, features and advantages will be apparent to those skilled in the art from the following detailed description taken in connection with the accompanying drawings in which.

In one aspect of the present invention, there is provided an artificial reef assembly construction which comprises, in combination, an artificial reef assembly comprising a plurality of artificial reef units each comprising a hollow structure having at one end thereof a first opening and at the other end thereof a second opening and having a peripheral framework extending from the circumference of the first opening to the circumference of the second opening, the peripheral framework comprising a plurality of first fiber-reinforced plastic bands wound spirally about at axis of the hollow structure from said first opening to said second opening at an oblique angle with the axis to have a plurality of phases of the number corresponding to the number of the first fiber-reinforced plastic bands and a plurality of second fiber-reinforced plastic bands wound spirally about the axis in a direction opposite to the first fiber-reinforced plastic bands to have a plurality of phases of the number corresponding to the number of the second fiber-reinforced plastic bands, thereby forming lattice pattern windows respectively defined by the first fiber-reinforced plastic bands and the second fiber-reinforced plastic bands intersecting therewith, and a predetermined number of floaters each comprising a body casing having an inner chamber fluid-tight, partitioned by means of at least one partition wall to have a plurality of air chambers, the floaters being releasably secured onto a corresponding number of the hollow structures of artificial reef units, respectively, at least one of the plurality of air chambers having at least one portion capable of being opened.

With respect to the specific structure of the floater, an illustrative explanation will now be given.

One form of a floater to be used in the present invention comprises a collapsible body casing made of a fluid-impermeable flexible material and having its inner chamber partitioned so as to be fluid tight by means of a partition wall to have a first chamber and a second chamber, the first chamber and the second chamber being in an air-filled state, the first chamber being capable of maintaining its air-filled state, the second chamber having at least one portion capable of being opened for permitting the air to be released out of the second chamber so that the second chamber is collapsed.

Another form of a floater to be used in the present invention comprises an uncollapsible body casing made of a rigid material and having its inner chamber partitioned to be floated tight by means of a partition wall to have a first chamber and a second chamber, the first chamber and the second chamber being in an air-filled state, the first chamber being adapted to maintain its air-filled state, and the second chamber having at least one portion capable of being opened for receiving sea water therein.

In the case of a floater made of a rigid material, the second chamber has at least one openable portion as mentioned above. When the openable portion of the second chamber of the floater releasably secured in the reef unit of the artificial reef assembly floated on the sea is opened, it is adapted to receive the sea water throughout the second chamber. To receive the sea water in the second chamber of each floater in such an quantity as will cause the artificial reef assembly with the floaters to be inclined at an angle sufficient to release each floater from the artificial reef assembly, it is necessary for the second chamber to discharge a corresponding quantity of air therefrom. To attain this effect, there may practically be adopted various configurations and/or arrangements with respect to the openable portion insofar as the following requirement is satisfied, that is, when only one openable portion is provided, this openable portion should have one part in contact with the air and another part in contact with the sea water when the floater is normally floated, and when a plurality of openable portions are provided, at least one of the openable portions should be in contact with the sea water when the floater is normally floated.

In order that the floater may be floated on the sea after being released from the artificial reef assembly so that it can be recovered, the first chamber of the floater should have a volume defined by the inequality:

$$V_A > W_A \left( \frac{1}{\rho_s} - \frac{1}{\rho} \right)$$

wherein $V_A$ represents a volume of the first chamber, $W_A$ a weight of the floater in the air, $\rho_s$ a density of the sea water and $\rho$ a density of the material constituting the body casing of the floater.

In the present invention, the term "air" is used to broadly include any suitable gas for filling the floater and is not intended to be limited to air. In the following description, there is used a term "air" for simplification of the explanation.

Figure 1:
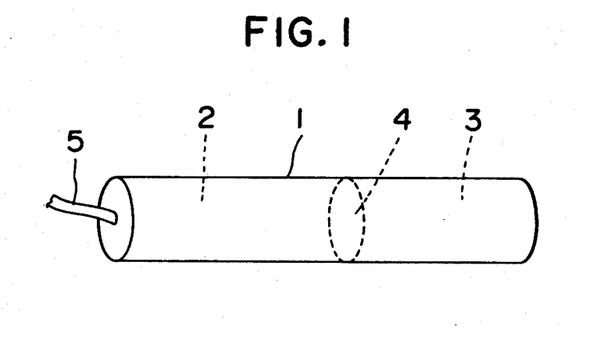
FIG. 1 is a diagrammatic perspective view of one form of a floater to be used in the present invention.
Figure 2:
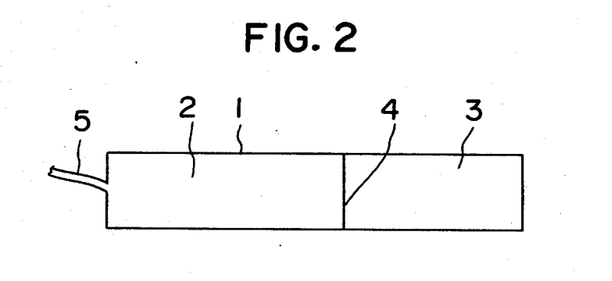
FIG. 2 is a diagrammatic longitudinally cross-sectional view of the floater of FIG. 1.

Referring now to FIGS. 1 and 2, there is shown one form of a floater to be used in the present invention. Number 1 designates a body casing. The body casing 1 is usually made of a rubber or a gas non-permeable synthetic fiber woven or knitted fabric having on its one surface or on both surfaces thereof an elastomer coat. In the latter case, illustratively stated, the body casing is made by a method in which a woven or knitted fabric of a synthetic fiber of a material having an appropriate elasticity and strength such as a polyamide, a polyester, a polyvinyl alcohol or the like is used as a substrate and one surface or both surfaces of the fabric is coated with an elastomer to form a gas non-permeable woven or knitted fabric, which is then sewn into a bag-like body having a desired shape according to the shape of the hollow structure of the reef unit, followed by attachment of a piece of the gas non-permeable woven or knitted fabric to the sewn portion by means of an adhesive. Examples of the elastomer include natural rubber and synthetic rubbers such as chlorinated polyethylene, polychloroprene, polybutadiene, polybutylene, a copolymer of acrylonitrile and butadiene and the like. A body casing made of such a gas non-permeable synthetic fiber woven or knitted fabric can be collapsed and, therefore, advantageously employed.

The inner chamber of the body casing 1 is fluid-tight, partitioned by means of a partition wall 4, to form a first chamber 3 and a second chamber 2. In this case, the second chamber 2 has a portion 5 which can be opened for permitting the air to be released out of the second chamber 2 when the portion 5 is opened so that the second chamber 2 is collapsed and the floater is inclined together with the artificial reef assembly at an angle sufficient for the floater to be automatically released from the artificial reef assembly, usually at an angle of at least 40° relative to the horizontal plane. Said openable portion 5 may be in the form of suitable closable opening such as cock means or valve means. In this type of a floater, a first chamber 4 is also provided with a cock or a valve means (not shown) for inflation thereof in use and for deflation thereof when collaping of the entire body casing 1 is intended, for example, for transportation or storage.

Figure 3:
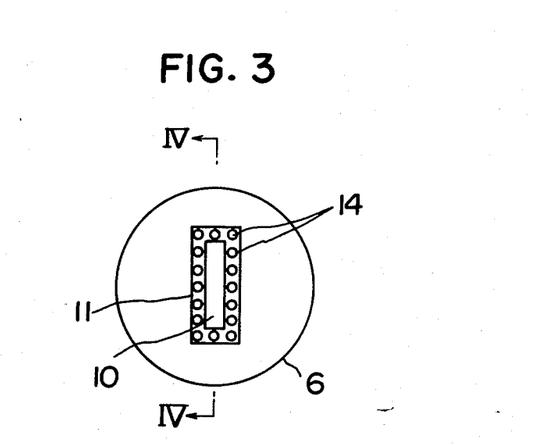
FIG. 3 is a front view of another form of a floater to be used in the present invention.
Figure 4:
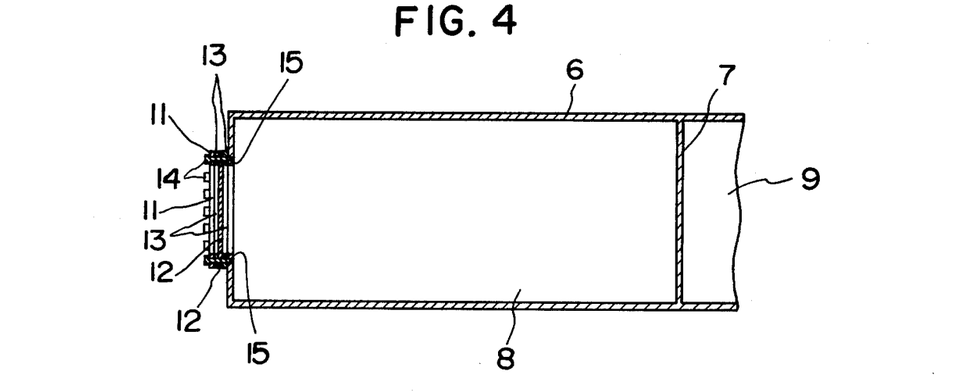
FIG. 4 is a partly cut-away longitudinally cross-sectional view taken along the line IV-IV in FIG. 3.

Referring to FIGS. 3 and 4, there is shown another form of a floater to be used in the present invention. A body casing 6 is made of steel. The inner chamber of the body casing 6 is partitioned to be fluid tight by means of a partition wall 7 to form a first chamber 9 and a second chamber 8. In this case, the second chamber 8 has an openable portion 10 for receiving the sea water therein when the portion 10 is opened so that the artificial reef assembly with the floaters is inclined at an angle sufficient for the floater to be automatically released from the artificial reef assembly, usually at an angle of at least 40° relative to the horizontal plane. The openable portion 10 is so located that a part thereof is in contact with the sea water and the other part is in contact with the air, when an artificial reef assembly is normally floated on the sea together with the floaters.

The openable portion 10 has such a structure that a first rubber packing 13 is disposed at the periphery of a rectangular opening formed in the second chamber at its free end, and superimposed on the first rubber packing 13 in the following order, a rigid plastic plate 12, a second rubber packing 13 and an iron-made framework 11, as depicted in FIGS. 3 and 4. The first rubber packing 13, rigid plastic plate 12, second rubber packing 13 and iron-made framework 11 are secured, and connected to the body casing 6 at its opening by means of bolts 14 received in a fluid tight manner by threaded holes 15 formed in the periphery of the opening of the second chamber, as is seen from FIG. 4. As the rigid plastic plate 12, a plane of a rigid plastic material such as rigid vinyl chloride of about 10 mm in thickness may generally be employed.

Figure 5:
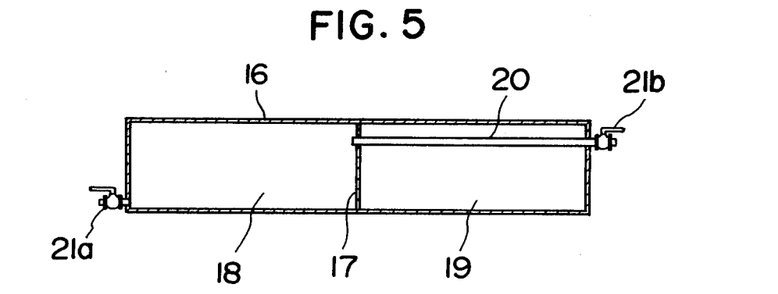
FIG. 5 is a longitudinally cross-sectional view of a further form of a floater to be used in the present invention.
Figure 6:
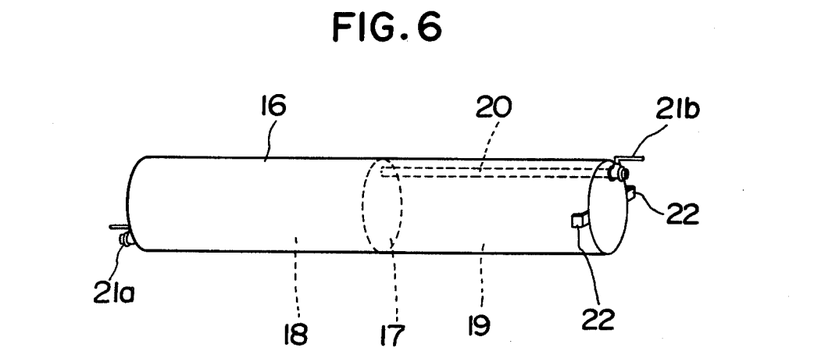
FIG. 6 is a diagrammatic perspective view of the floater of FIG. 5.
Figure 7:
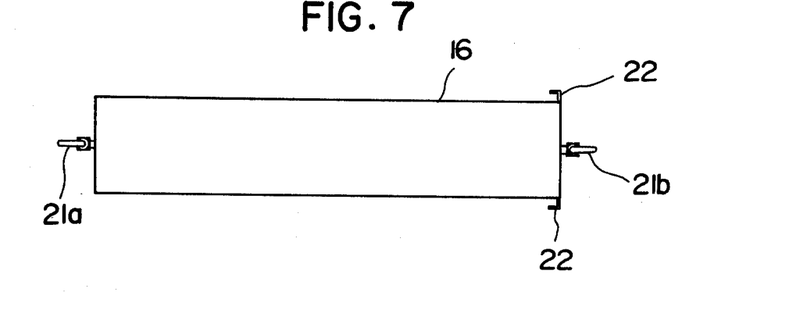
FIG. 7 is a plan view of the floater of FIG. 5.

Referring to FIGS. 5 to 7, there is shown still another form of a floater to be used in the present invention. A body casing 16 may be made of steel or a rigid plastic material, but preferably made of steel in this embodiment. The inner chamber of the body casing 16 is fluid-tight, partitioned by means of a partition wall 17 to form a first chamber 19 and a second chamber 18 longitudinally arranged. In this case, the second chamber 18 is provided with a cock 21a for receiving the sea water thereinto. On the other hand, the second chamber 18 is provided with an additional cock 21b through the medium of a pipe 20 for discharging the air therefrom so that the sea water can enter into the second chamber 18 in a quantity sufficient for the artificial reef assembly, with the floaters, to be inclined at an angle sufficient for the floater to be automatically released from the artificial reef assembly, usually at an angle of at least 40° relative to the the horizontal plane so that the floater may be automatically released from the artificial reef assembly.

The cock 21a is so located that it is in contact with the sea water, while the cock 21b is so located that it is in contact with the air when an artificial reef assembly is normally staying afloat on the sea. The cock 21a is connected to the free end portion of the second chamber 18. The cock 21b is connected to the second chamber 18 through the medium of the pipe 20 as a flow way for the air to be released out of the second chamber 18. The end of the pipe 20 penetrates the partition wall 17 for communication of the second chamber 18 with the cock 21b and is connected to the partition wall 17 by welding.

As is shown in FIGS. 6 and 7, a pair of hooks 22 may be fixedly attached to opposite positions of the edge of the forward end of the floater, thus preventing the floater from flying out of the artificial reef assembly in the course of transportation on the sea.

Figure 8:
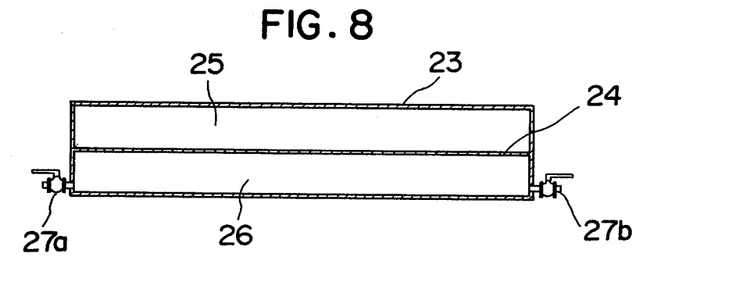
FIG. 8 is a longitudinally cross-sectional view of a still further form of a floater to be used in the present invention.

Referring to FIG. 8, there is shown a further form of a floater to be used in the present invention. A body casing 23 is made of steel or a rigid plastic material. In this case, the inner chamber of the body casing 23 is partitioned so as to be fluid tight by means of a partition wall 24 to form a first chamber 25 and a second chamber 26 vertically arranged. The second chamber 26 is provided with two cocks 27a and 27b. The cock 27a and the cock 27b are connected to one end portion and the other end portion of the second chamber 26, respectively. Alternatively, the handle of the cock 27a may be connected to the handle of the cock 27b by means of a wire passing through a pipe extending in the second chamber 26 from one end thereof to the other end thereof. With such a construction (not shown in the drawings), the opening operations of the two openable portions can be synchronized.

In the case of such a floater as shown in FIG. 8, the floater is disposed in the reef unit in such a manner that, for example, the end of the floater to which end the cock 27a is attached slightly protrudes from the end of the reef unit. In addition, the cock 27b is so located that it is in contact with the sea water when an artificial reef assembly is afloat on the sea together with the floaters. When the cocks 27a and 27b are opened the sea water enters into the second chamber 26 through the cock 27b while discharging the air from the cock 27a. In this case, the artificial reef assembly with the floaters is caused to be inclined with the cock 27a-having end portion of each of the floaters being raised. As a result of this, the artificial reef assembly with its floaters can be inclined to attain a desired angle for the floaters to be released from the artificial reef assembly.

In the foregoing, the explanation is directed to floaters each having one first chamber and one second chamber. However, it should be noted that the number of the first and second chambers is not critical, and not limited to 2 (two). A floater having an inner chamber partitioned to form a plurality of first chambers and a plurality of second chambers falls within the scope of the present invention. In addition, the first and second chambers may have various configurations and can be arranged in other ways. The floaters as illustrated in FIG. 1 through FIG. 8 are merely preferred examples of floaters to be used in the present invention. According to the present invention, it is essential that after air-discharge from the second chamber, the body casing of the floater undergoes a change at longitudinally positioned portions thereof, thereby to cause the artificial reef assembly with its floaters to be inclined at an angle sufficient for the floaters to leave the artificial reef assembly. Insofar as the requirement mentioned above is satisfied, there is no restriction in the number of the first and second chambers and various configurations and/or arrangements of chambers which can be adopted. In the meantime, in the case of a floater made of a flexible material, air discharge from the second chamber of the floater and the collapse thereof can be sufficiently effected by providing only one openable portion in the second chamber. However, provision for two openable portions is particularly preferred, because the rate of air-discharge can be accelerated.

According to the present invention, the openable portion may generally be employed in the form of such a closable opening as a cock means or valve means or in the form of a breakable window such as shown in FIGS. 3 and 4. However, in an extreme case, the provision of an openable portion of the second chamber of the floater may be attained without providing the floater with any additional means. In this case, such an openable portion can be provided in the form of a part of the wall of the second chamber, this part being able to be broken by means of a gun, harpoon or the like, or by utilizing explosion of a gun powder incorporated into the part and being repairable after recovery of the floater.

Figure 9:
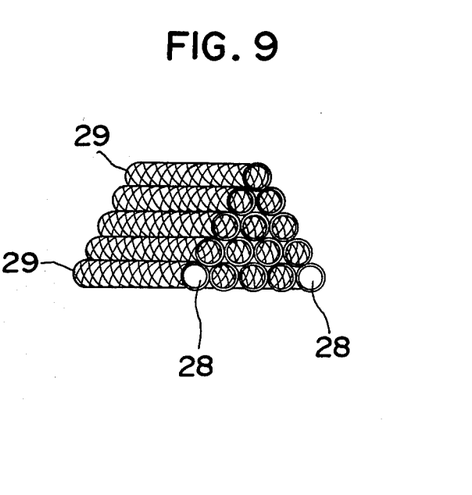
FIG. 9 is a diagrammatic perspective view of one form of an artificial reef assembly construction.

Referring to FIG. 9, there is shown a diagrammatic view of one form of an artificial reef assembly construction in which an artificial reef assembly composed of fifteen cylindrical reef units 29 has two floaters 28 securely inserted into the reef units as depicted. The artificial reef assembly comprises a plurality of artificial reef units each comprising a hollow structure having at one end thereof a first opening and at the other end thereof a second opening and having a peripheral framework extending from the circumference of the first opening to the circumference of the second opening, the peripheral framework comprising a plurality of first fiber-reinforced plastic bands wound spirally about an axis of the hollow structure from the first opening to the second opening at an oblique angle with the axis to have a plurality of phases of the number corresponding to the number of the first fiber-reinforced plastic bands and a plurality of second fiber-reinforced plastic bands wound spirally about the axis in a direction opposite to the first fiber-reinforced plastic bands to have a plurality of phases of the number corresponding to the number of the second fiber-reinforced plastic bands, thereby forming lattice pattern windows respectively defined by the first fiber-reinforced plastic bands and the second fiber-reinforced plastic bands intersecting therewith. In the artificial reef assembly, each of the reef units is connected with adjacent reef units. The reef units of hollow structure located at the lowest position of the artificial reef assembly have, at their respective inner faces or outer faces or at respective both faces thereof, a concrete as a weight fixedly adhered thereto (not shown) so that the artificial reef assembly can stand strong tidal currents and strong forces of waves after being submerged beneath the sea.

With respect to the structure of a reef unit of the artificial reef assembly, to increase the durability and fish-gathering effect, it is particularly preferred to employ the structure disclosed in copending U.S. patent application Ser. No. 166,912. Such a structure is characterized in that:

each first fiber-reinforced plastic band and each second fiber-reinforced plastic band is composed of at least two layers of elongated fiber-reinforced plastics each comprising glass-based fibers and a thermohardened resin, thus rendering each of the intersections of said first fiber-reinforced plastic bands and said second fiber-reinforced plastic bands to be a unitary joint formed of at least four layers of fiber-reinforced plastics in which each of the layers constituting the first fiber-reinforced plastic band is laid alternately with each of the layers constituting the second fiber-reinforced plastic band, the fiber-reinforced plastic has a bending strength of 18 to 100 kg/mm$^2$ and a modulus of elasticity of 800 to 7,000 kg/mm$^2$, the hollow structure has a cross-sectional area on a plane perpendicular to the axis of 0.3 to 7 m$^2$, the first fiber-reinforced plastic band and second fiber-reinforced plastic band each has a cross-sectional area of 2 to 15 cm$^2$, the peripheral framework has a total band surface area of 15 to 50% based on the imaginary entire surface area of framework, and the windows each has an open area of 0.1 to 0.8 m$^2$.

Furthermore, such a structure that the hollow structure has a reducing diameter from one end to the other end is also preferred. When the reef unit having such a tapered structure, the shape of a floater should be so designed that it can be fitted to such a tapered shape.

In another aspect of the present invention, there is provided a method for floating an artificial reef assembly on the sea by means of floaters releasably secured thereto, transporting the artificial reef assembly to a predetermined location, submerging the same beneath the sea and recovering the floaters which comprises:

releasably fitting to an artificial reef assembly a predetermined number of floaters each comprising a body casing having an inner chamber fluid-tightly partitioned by means of at least one partition wall to have a plurality of air chambers, at least one of the plurality of air chambers having at least one openable portion, the floaters each having the plurality of air chambers filled with air, the artificial reef assembly comprising a plurality of artificial reef units each comprising a hollow structure having at one end thereof a first opening and at the other end thereof a second opening and having a peripheral framework extending from the circumference of the first opening to the circumference of the second opening, the peripheral framework comprising a plurality of first fiber-reinforced plastic bands wound spirally about an axis of the hollow structure from the first opening to the second opening at an oblique angle with the axis to have a plurality of phases of the number corresponding to the number of the first fiber-reinforced plastic bands and a plurality of second fiber-reinforced plastic bands wound spirally about the axis in a direction opposite to the first fiber-reinforced plastic bands to have a plurality of phases of the number corresponding to the number of the second fiber-reinforced plastic bands, thereby forming lattice pattern windows respectively defined by the first fiber-reinforced plastic bands and the second fiber-reinforced plastic bands intersecting therewith, the releasable fitting of the predetermined number of floaters to the artificial reef assembly being effected by securely inserting the floaters into a corresponding number of the hollow structures of artificial reef units, respectively, floating said artificial reef assembly with said floaters on the sea and towing the same to a predetermined location, opening the at least one openable portion of at least one of the air chambers of each of the floaters to discharge the air therefrom while keeping the remaining at least one air chamber in the air-filled state, causing the floaters to be released from the hollow structures of reef units of the artificial reef assembly whereby the artificial reef assembly is submerged beneath the sea, leaving the floaters at the surface of the sea, and recovering the floaters left afloat on the sea.

With respect to the method of opening at least one openable portion of the second chamber of each of the floaters to cause the artificial reef assembly with the floaters to be inclined and then to release the floaters from the artificial reef assembly whereby the artificial reef assembly is submerged beneath the sea while leaving the floaters at the surface of the sea, an illustrative explanation will be given as follows.

In one mode in which a floater as illustrated in FIGS. 1 and 2, at least one openable portion provided in the second chamber of each of the floaters is manually opened to permit the air to be discharged therefrom so that the second chamber is deflated and collapses and the artificial reef assembly with the floaters is inclined at an angle sufficient for the floaters to be automatically released from the artificial reef assembly. As a result of the release of the floaters, the artificial reef assembly is submerged, leaving the floaters at the surface of the sea.

In another mode in which a floater as illustrated in FIGS. 3 and 4 is employed, at least one openable portion provided in the second chamber of each of the floaters is broken so as to open, for example, by a rifleshot. Upon opening the openable portion provided in the second chamber of each of the floaters, the sea water enters into the second chamber in such a quantity so as to cause the artificial reef assembly with the floaters to be inclined at an angle sufficient to release each floater from the artificial reef assembly. After the release of the floaters, the artificial reef assembly is submerged, leaving the floaters at the surface of the sea.

In still another mode in which a floater as illustrated in FIGS. 5 to 7 is employed, the opening operations of at least one openable portion provided in the second chamber of each of the floaters and at least one additional openable portion connected to the second chamber through the medium of a pipe are manually conducted. Upon opening the openable portion provided in the second chamber, the sea water begins to enter into the second chamber from the opened portion thereof in a quantity sufficient for the the artificial reef assembly with the floaters to be inclined while the air in the second chamber is discharged from the other opened portion, so that the floaters are automatically released from the artificial reef assembly. After the release of the floaters, the artificial reef assembly is submerged, leaving the floaters at the surface of the sea.

In a further mode in which a floater as illustrated in FIG. 8 is employed, at least two openable portions are provided in the second chamber of each of the floaters and they are manually opened. In this case, floaters are disposed in a predetermined number of the artificial reef units in such a manner that the center of bouyancy of the floaters slightly deviates longitudinally with respect to the center of gravity of the artificial reef assembly so that one end of each floater slightly protrudes out of the reef unit. Upon opening the openable portions, the sea water begins to enter into the second chamber from one of the opened portions thereof, while the air in the second chamber is discharged from the other opened portion. The sea water thus enters into the second chamber through the opened portion thereof in such a quantity as will cause the artificial assembly with its floaters to be inclined, with the other portion of each of the floaters having an opened portion being raised, at an angle sufficient for the floaters to be released from the artificial reef assembly. As a result of the release of the floaters, the artificial reef assembly is submerged, leaving the floaters at the surface of the sea.

Figure 10:
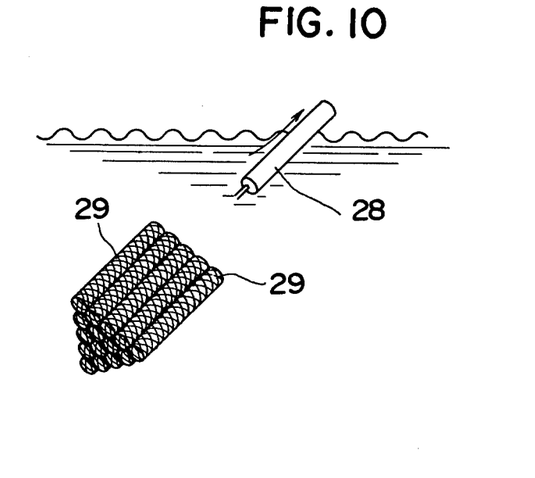
FIG. 10, FIG. 11 and FIG. 12 are diagrammatic views explaining how to submerge an artificial reef assembly while leaving a floater used therein on the sea and install the artificial reef assembly on the sea bottom.
Figure 11:
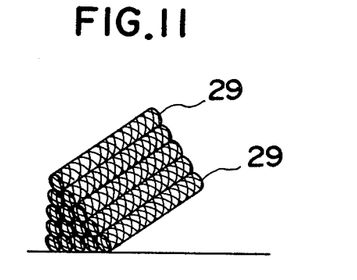
Figure 12:
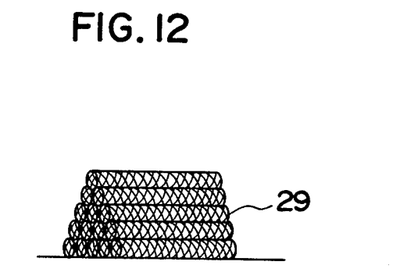

In FIG. 10, there is shown an illustration of how the artificial reef assembly is submerged. In the position illustrated in FIG. 10, upon opening the openable portion of at least one of the air chambers, the air is discharged therefrom to cause the artificial reef assembly to sink in the inclined state, while the floaters 28 are released from the reef units 29 and caused to leave in the direction indicated by an arrow by the action of the air remaining in at least one closed air chamber. The artificial reef assembly comprising the reef units are then submerged to the position of FIG. 12 through the position of FIG. 11 and installed at the desired location on the sea bottom, while leaving the floaters at the sea surface.

The time for the floaters to be released from the artificial reef assembly floating on the sea is influenced by the size and number of the openable portions, the weight of the artificial reef assembly and the volume of the air chamber to be subjected to air-discharge. By appropriately regulating these factors, the above-mentioned time may be suitably determined.

As described, according to the present invention, an artificial reef assembly as large as, e.g., 20 tons in weight and 10 m in height, can be towed by a small boat to a desired location and, in addition, many reef assemblies can be towed and transported at one time. Furthermore, it should be noted that, according to the present invention, without a need for using a large-size boat with a crane mounted thereon, the artificial reef assembly can be easily submerged and installed on the sea bottom by only opening at least one openable portion of at least one of the air chambers. The conventionally proposed floaters are difficult to not only remove from the artificial reef assembly but also to recover even after removal because the removed floaters are also submerged. In contrast, according to the present invention, the body casing of each of the floaters are subjected to different buoyancy at longitudinally different portions thereof, thereby causing the floaters to be inclined and automatically released from the artificial reef assembly so that the artificial reef assembly is submerged while leaving the floaters at the surface of the sea, leading to ease in recovering them. For example, the floaters left afloat on the sea can be easily recovered by towing them to the coast through the sea during the course of the workers returning to shore.

The above description has been made with respect to the use in the sea. The present artificial reef assembly construction and method may also be used in a lake.

The invention being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A method for floating an artificial reef assembly on the sea by means of floaters releasably secured thereinto, transporting the artificial reef assembly to a predetermined location, submerging the same beneath the sea and recovering the floaters which comprises:

releasably fitting to an artificial reef assembly a predetermined number of floaters each comprising a body casing having an inner chamber fluid-tightly partitioned by means of at least one partition wall to have a plurality of air chambers, at least one of said plurality of air chambers having at least one openable portion, said floaters each having said plurality of air chambers filled with air, said artificial reef assembly comprising a plurality of artificial reef units each comprising a hollow structure having at one end thereof a first opening and at the other end thereof a second opening and having a peripheral framework extending from the circumference of said first opening to the circumference of said second opening, said peripheral framework comprising a plurality of first fiber-reinforced plastic bands wound spirally about an axis of the hollow structure from said first opening to said second opening at an oblique angle with the axis to have a plurality of phases of the number corresponding to the number of the first fiber-reinforced plastic bands and a plurality of second fiber-reinforced plastic bands wound spirally about the axis in a direction opposite to said first fiber-reinforced plastic bands to have a plurality of phases of the number corresponding to the number of the second fiber-reinforced plastic bands, thereby forming lattice pattern windows respectively defined by said first fiber-reinforced plastic bands and said second fiber-reinforced plastic bands intersecting therewith, the releasable fitting of the predetermined number of floaters to the artificial reef assembly being effected by securely inserting the floaters into a corresponding number of the hollow structures of artificial reef units, respectively, floating said artificial reef assembly with said floater on the sea and towing the same to a predetermined location, opening said at least one openable portion of at least one of the air chambers of each of the floaters to discharge the air therefrom while keeping the remaining at least one air chamber in the air-filled state, causing the floaters to be released out of the hollow structures of reef units of the artificial reef assembly whereby the artificial reef assembly is submerged beneath the sea, leaving the floaters on the sea, and recovering the floaters left afloat on the sea.

2. A method for floating an artificial reef assembly on the sea by means of floaters releasably secured thereinto, transporting the artificial reef assembly to a predetermined location, submerging the same beneath the sea and recovering the floaters which comprises:

releasably fitting to an artificial reef assembly a predetermined number of floaters each comprising a collapsible body casing made of a fluid-impermeable flexible material having an inner chamber fluid-tightly partitioned by means of a partition wall to have a first chamber and a second chamber, said second chamber having at least one openable portion, said floaters each having said first and second chambers filled with air, said artificial reef assembly comprising a plurality of artificial reef units each comprising a hollow structure having at one end thereof a first opening and at the other end thereof a second opening and having a peripheral framework extending from the circumference of said first opening to the circumference of said second opening, said peripheral framework comprising a plurality of first fiber-reinforced plastic bands wound spirally about an axis of the hollow structure from said first opening to said second opening at an oblique angle with the axis to have a plurality of phases of the number corresponding to the number of the first fiber-reinforced plastic bands and a plurality of second fiber-reinforced plastic bands wound spirally about the axis in a direction opposite to said first fiber-reinforced plastic bands to have a plurality of phases of the number corresponding to the number of the second fiber-reinforced plastic bands, thereby forming lattice pattern windows respectively defined by said first fiber-reinforced plastic bands and said second fiber-reinforced plastic bands intersecting therewith, the releasable fitting of the predetermined number of floaters to the artificial reef assembly being effected by securely inserting the floaters into a corresponding number of the hollow structures of artificial reef units, respectively, floating said artificial reef assembly with said floaters on the sea and towing the same to a predetermined location, opening said at least one openable portion of the second chamber of each of the floaters to discharge the air therefrom so that the second chamber is collapsed under the pressure of sea water and the artificial reef assembly with the floaters is caused to be inclined at an angle, relative to the horizontal plane, sufficient for the floaters to be released out of the artificial reef assembly, thereby causing the artificial reef assembly to be submerged beneath the sea, leaving the floaters on the sea, and recovering the floaters left afloat on the sea.

3. A method for floating an artificial reef assembly on the sea by means of floaters releasably secured thereinto, transporting the artificial reef assembly to a predetermined location, submerging the same beneath the sea and recovering the floaters which comprises:

releasably fitting to an artificial reef assembly a predetermined number of floaters each comprising an uncollapsible body casing made of a rigid material having an inner chamber fluid-tightly partitioned by means of a partition wall to have a first chamber and a second chamber, said second chamber having at least one openable portion, said floaters each having said first and second chambers filled with air, said artificial reef assembly comprising a plurality of artificial reef units each comprising a hollow structure having at one end thereof a first opening and at the other end thereof a second opening and having a peripheral framework extending from the circumference of said first opening to the circumference of said second opening, said peripheral framework comprising a plurality of first fiber-reinforced plastic bands wound spirally about an axis of the hollow structure from said first opening to said second opening at an oblique angle with the axis to have a plurality of phases of the number corresponding to the number of the first fiber-reinforced plastic bands and a plurality of second fiber-reinforced plastic bands wound spirally about the axis in a direction opposite to said first fiber-reinforced plastic bands to have a plurality of phases of the number corresponding to the number of the second fiber-reinforced plastic bands, thereby forming lattice pattern windows respectively defined by said first fiber-reinforced plastic bands and said second fiber-reinforced plastic bands intersecting therewith, the releasable fitting of the predetermined number of floaters to the artificial reef assembly being effected by securely inserting the floaters into a corresponding number of the hollow structures of artificial reef units, respectively, floating said artificial reef assembly with said floaters on the sea and towing the same to a predetermined location, opening said at least one openable portion of the second chamber of each of floaters so that said second chamber receives sea water therein in such a quantity as will cause the artificial reef assembly with the floaters to be inclined at an angle, relative to the horizontal plane, sufficient for the floaters to be released out of the artificial reef assembly, thereby causing the artificial reef assembly to be submerged beneath the sea, leaving the floaters on the sea, and recovering the floaters left afloat on the sea.

* * * * *